United States Patent
Ko et al.

(10) Patent No.: US 7,149,023 B2
(45) Date of Patent: Dec. 12, 2006

(54) OPTICAL SCANNER CAPABLE OF FLIP-CHIP HERMETIC PACKAGING

(75) Inventors: Young-chul Ko, Gyeonggi-do (KR); Yong-kweun Mun, Gyeonggi-do (KR); Won-kyoung Choi, Gyeonggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 35 days.

(21) Appl. No.: 11/209,787

(22) Filed: Aug. 24, 2005

(65) Prior Publication Data

US 2006/0098261 A1    May 11, 2006

(30) Foreign Application Priority Data

Nov. 9, 2004 (KR) .................... 10-2004-0090890

(51) Int. Cl.
*G02B 26/08* (2006.01)
(52) U.S. Cl. .................. 359/224; 359/291; 359/212
(58) Field of Classification Search ............ 359/196, 359/197, 198, 199–205, 208, 212, 214, 220, 359/221
See application file for complete search history.

(56) References Cited

U.S. PATENT DOCUMENTS 5,945,599 A * 8/1999 Fujiyoshi et al. ........ 73/504.12
6,731,420 B1 * 5/2004 Orcutt et al. ............. 359/223
2002/0149864 A1 * 10/2002 Kaneko .................... 359/846
2004/0100679 A1 * 5/2004 Kuo ........................ 359/291

* cited by examiner

Primary Examiner—Euncha P. Cherry
(74) Attorney, Agent, or Firm—Buchanan Ingersoll & Rooney PC

(57) ABSTRACT

Provided is an optical scanner capable of hermetic sealing with a round of flip-chip bonding. The optical scanner includes an upper substrate and a lower substrate, a mirror suspended between the upper substrate and the lower substrate to seesaw, a plurality of movable comb electrodes vertically formed at predetermined intervals at both sides of the mirror, a plurality of upper static comb electrodes and lower static comb electrodes respectively vertically installed on the upper substrate and the lower substrate to alternate with the plurality of movable comb electrodes, a plurality of electrode structures respectively transmitting external voltage to the upper and lower static comb electrodes and the movable comb electrodes, and an upper outer frame and a lower outer frame respectively formed along edges of the upper and lower substrates and bonded to each other to seal the mirror from the outside.

14 Claims, 5 Drawing Sheets

OPTICAL SCANNER CAPABLE OF FLIP-CHIP HERMETIC PACKAGING

BACKGROUND OF THE INVENTION

Priority is claimed from Korean Patent Application No. 10-2004-0090890, filed on Nov. 9, 2004, in the Korean Intellectual Property Office, the disclosure of which is incorporated herein in its entirety by reference.

1. Field of the Invention

The present invention relates to an optical scanner capable of flip chip hermetic packaging, and more particularly, to an optical scanner capable of hermetic sealing with a round of flip-chip bonding.

2. Description of the Related Art

Micro-electromechanical system (MEMS) optical scanners employed in projection televisions and the like deflect a laser beam using an electrostatic effect produced by comb-typed electrodes. Such micro-optical scanners are generally structured such that a mirror is suspended to seesaw by a supporter formed on a substrate such as a silicon-on insulator (SOI) wafer. A plurality of movable comb electrodes are vertically formed at both sides of the mirror, and a plurality of static comb electrodes are vertically installed on the SOI wafer to alternate with the movable comb electrodes. In recent years, optical scanners with a double comb electrode structure in which static comb electrodes are installed over and under movable comb electrodes have been developed. In this structure, voltages having opposite polarities are applied to the movable comb electrodes and the static comb electrodes, and an electrostatic force is generated between the movable and static electrodes, causing the mirror to seesaw at high speed. Accordingly, a laser beam incident on the mirror can be deflected at high speed.

Such optical scanners are very sensitive to environmental conditions since the mirror has a very small size (e.g., a size less than several millimeters). Accordingly, hermetic sealing is needed to maintain the performance of the optical scanners and protect the optical scanners from changes in environmental conditions.

FIGS. 1A through 1E are cross-sectional views illustrating a process of hermetically sealing an optical scanner.

First, FIG. 1A is a cross-sectional view illustrating lower and upper structures of an optical scanner with a double comb electrode structure. In the lower structure, a mirror 12 is suspended over a lower substrate 10 through a torsion spring 13, and movable comb electrodes 14a and 14b are formed at both sides of the mirror 12. Lower static comb electrodes 11a and 11b are installed on the lower substrate 10 under the movable comb electrodes 14a and 14b. The lower static comb electrodes 11a and 11b receive voltage through first lower support parts 16, and electrode pads 18 are formed under the first lower support parts 16. The movable comb electrodes 14a and 14b receive voltage through second lower support parts 17 over the first lower support parts 16. Although not shown, the second lower support parts 17 extend up to the torsion spring 13 to support the torsion spring 13. An insulation layer 19 is interposed between the first lower support parts 16 and the second lower support parts 17.

In the upper structure, upper static comb electrodes 21a and 21b are installed on an upper substrate 20 to face the lower static comb electrodes 11a and 11b. The upper static comb electrodes 21a and 21b receive voltage through upper support parts 24. To apply voltage to the upper support parts 24, a plurality of through-holes 22 are formed on the upper substrate 20. Electrode pads 23 are formed along the through-holes 22 and a top surface of the upper substrate 20. Furthermore, solder layers 25 are formed on the upper support parts 24 to bond the upper substrate to the lower substrate 10. Although not shown, an opening through which a laser beam can pass is formed on a portion of the upper substrate 20 to face the mirror 12.

The separately manufactured lower structure 10 and upper structure 20 are assembled through a flip-chip bonding process as shown in FIG. 1B. That is, the solder layers 25 of the upper substrate 20 are bonded to metal pads 15 on the second lower support parts 17 of the lower substrate 10, thereby completing an optical scanner.

The completed scanner is mounted on a bottom surface of a ceramic package 30 using a die bonding method or the like as shown in FIG. 1C. After the optical scanner is mounted on the bottom surface of the ceramic package 30, wires 37 are connected between the electrode pads 18 and 23 and electrode pads (not shown) disposed on inner walls of the ceramic package 30 as shown in FIG. 1D. The electrode pads of the ceramic package 30 are connected to leads 36 that downwardly protrude from the ceramic package 30, and receive voltage from the outside. After the wiring is completed, a glass 38 is bonded to top surfaces of side walls 31 of the ceramic package 30, as shown in FIG. 1E, to completely seal the optical scanner from the outside. Although the side walls 31 are shown at both sides of the ceramic package 30 in FIGS. 1C through 1E, the side walls 31 are also formed at front and rear sides of the ceramic package 30, making it possible to completely seal the optical scanner.

As described above, a conventional method of manufacturing an optical scanner includes a process of bonding upper and lower structures of the optical scanner, a process of die-bonding the optical scanner to a ceramic package, a process of connecting wires between the ceramic package and the optical scanner, and a process of hermetically sealing the optical scanner from the outside by mounting a glass on side walls of the ceramic package. Accordingly, manufacturing processes are complex and much manufacturing time and costs are required. Moreover, since the ceramic package surrounding the optical scanner is three or four times larger than a real optical scanner, the ceramic package runs counter to a recent trend of a small layer display. When the ceramic package is used to manufacture a laser display, there is a limitation in miniaturization. In addition, since bonding is performed many times and many kinds of solders are used in each process, the reliability of the laser display is affected, and since the number of processes is high, the yield of the laser display is reduced.

SUMMARY OF THE INVENTION

Embodiments of the present invention provides an optical scanner, which can be simply manufactured to reduce manufacturing time and costs and enhance product reliability and yield.

The present invention also provides an optical scanner capable of hermetic sealing with a round of flip-chip bonding.

According to an aspect of the present invention, there is provided an optical scanner comprising: an upper substrate and a lower substrate; a mirror suspended between the upper substrate and the lower substrate to seesaw; a plurality of movable comb electrodes vertically formed at predetermined intervals at both sides of the mirror; a plurality of upper static comb electrodes and lower static comb electrodes respectively vertically installed on the upper substrate and the lower substrate to alternate with the plurality of movable comb electrodes; a plurality of electrode structures respectively transmitting external voltage to the upper and lower static comb electrodes and the movable comb electrodes; and an upper outer frame and a lower outer frame respectively formed along edges of the upper and lower substrates and bonded to each other to seal the mirror from the outside.

The upper substrate may be made of a light-transmitting material. An anti-reflection coating may be applied on a surface of the upper substrate.

The electrode structures may comprise: a first electrode structure transferring voltage to the movable comb electrodes; second and third electrode structures respectively transferring voltage to the lower static comb electrodes at both sides of the mirror; and fourth and fifth electrode structures respectively transferring voltage to the upper static comb electrodes at both the sides of the mirror.

The first through third electrode structures may be formed on the lower substrate, and the fourth and fifth electrode structures may comprise fourth and fifth lower electrode structures formed on the lower substrate and fourth and fifth upper electrode structures formed on the upper substrate.

The lower substrate further may have first through fifth through-holes respectively connected to the first through third electrode structures and the fourth and fifth lower electrode structures to transfer voltage. Electrodes may be respectively formed on surfaces of the first through fifth through-holes.

The optical scanner may be mounted on a surface of a printed circuit board through the electrodes formed on the surfaces of the first through fifth through-holes.

The first electrode structure for transferring voltage to the movable comb electrodes may also function as a supporter for supporting the mirror to seesaw.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which preferred embodiments of the invention are shown.

Figure 1A:
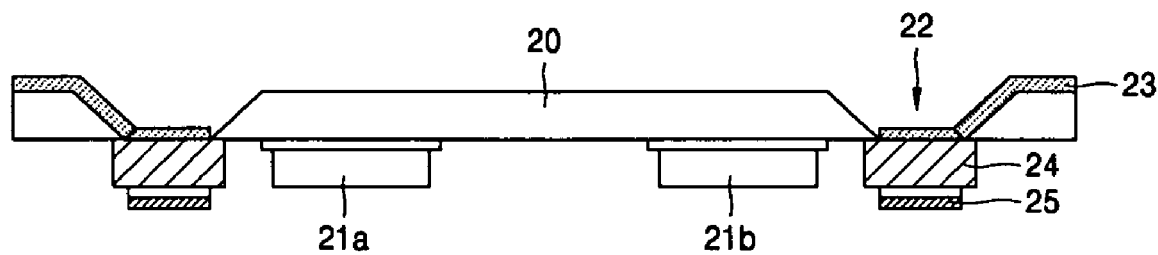
FIGS. 1A through 1E are cross-sectional views illustrating a process of hermetically sealing a conventional optical scanner.
Figure 1A:
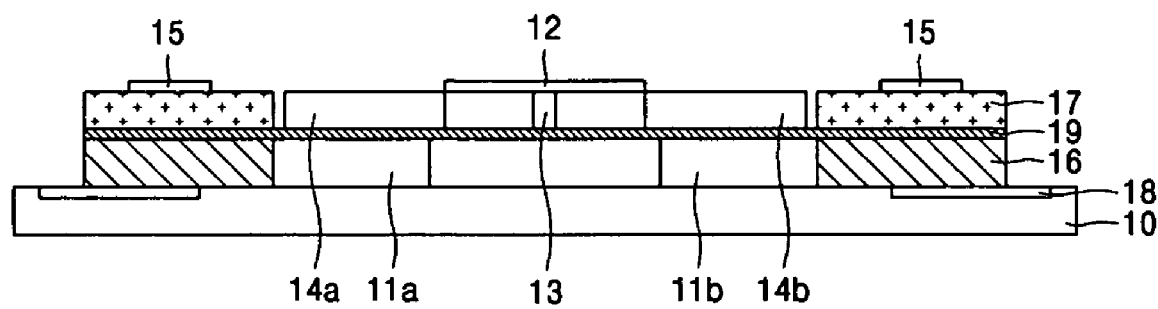
Figure 1B:
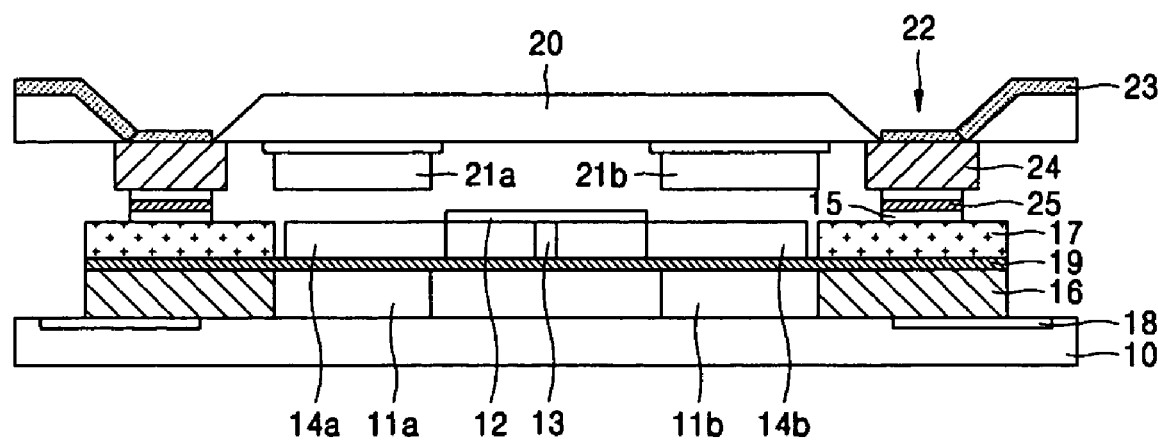
Figure 1C:
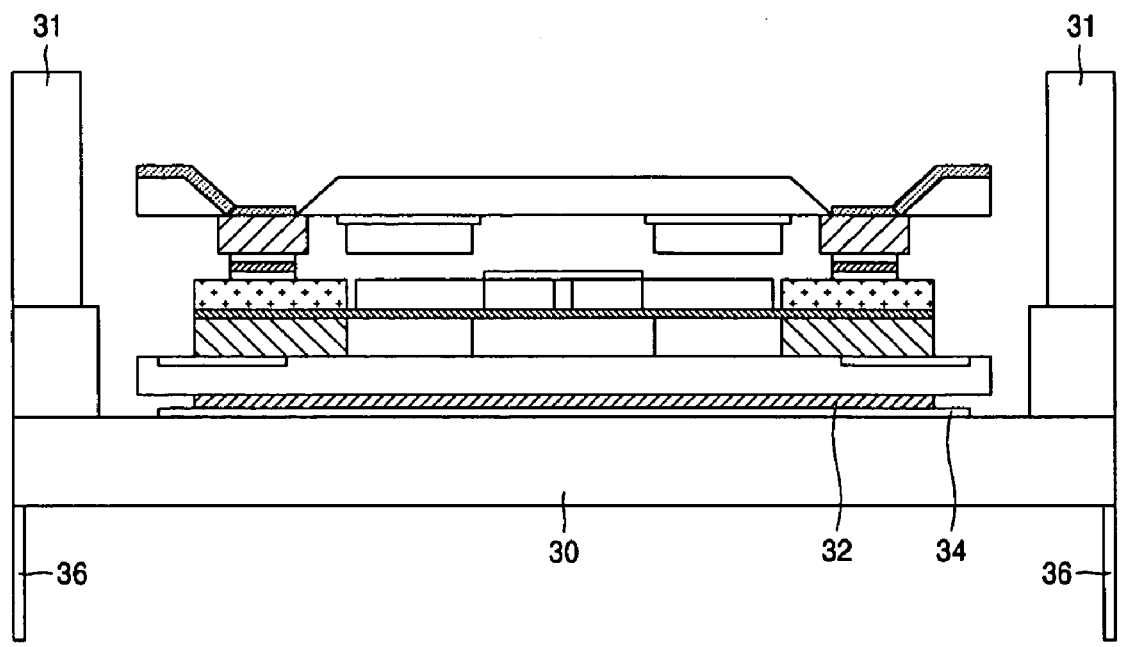
Figure 1D:
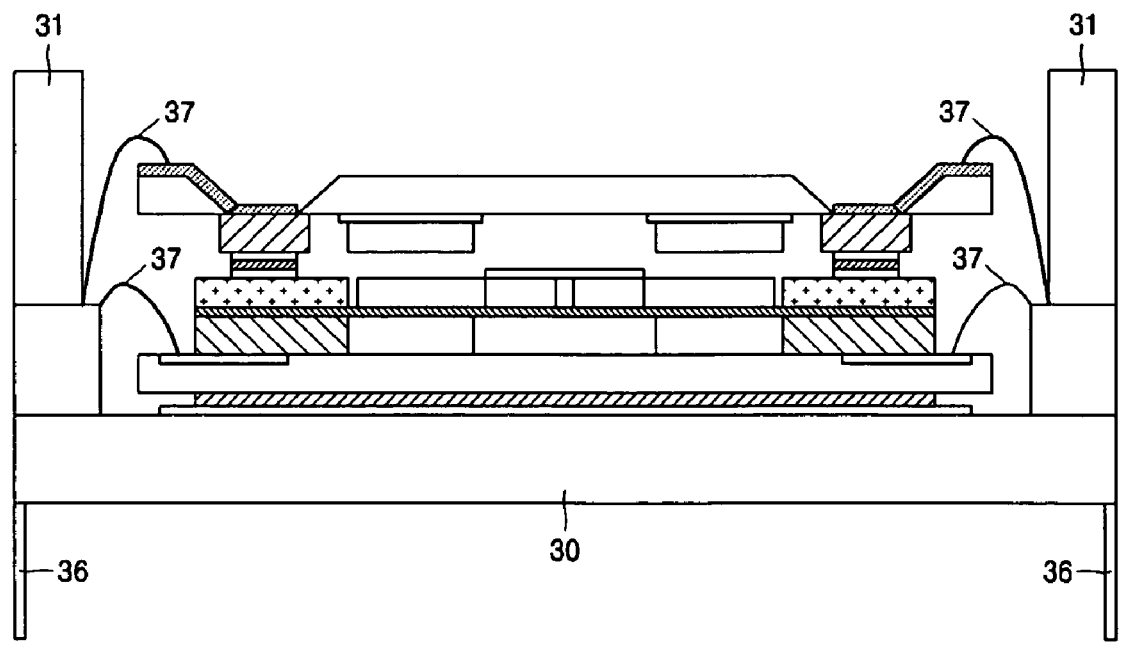
Figure 1E:
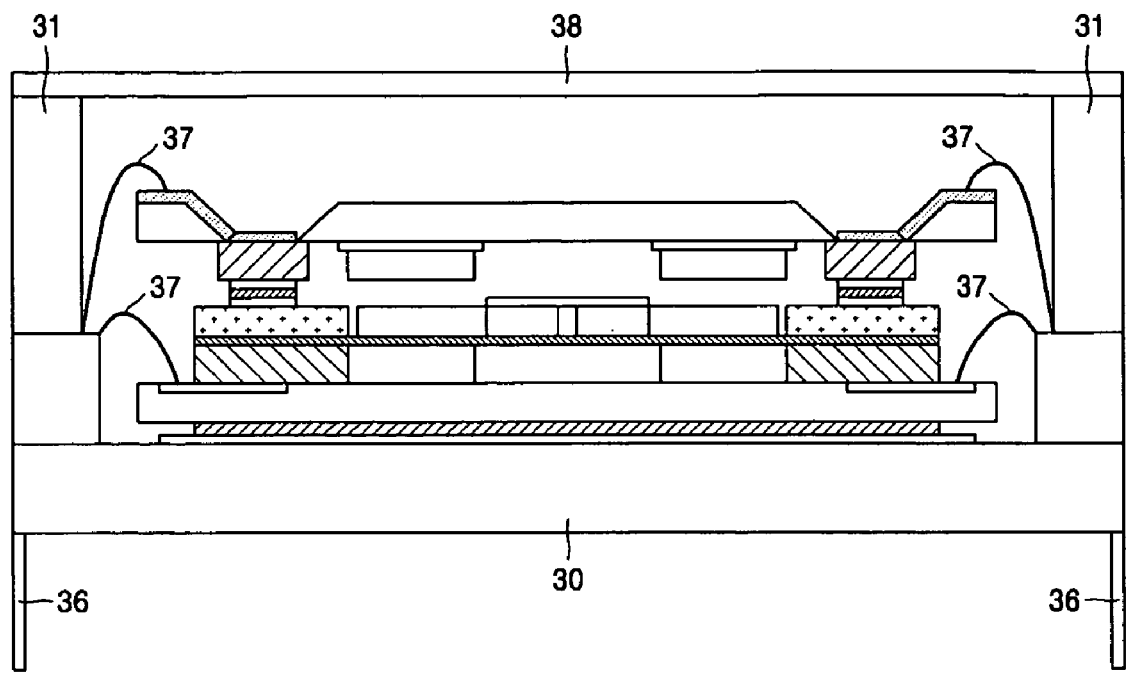
Figure 2A:
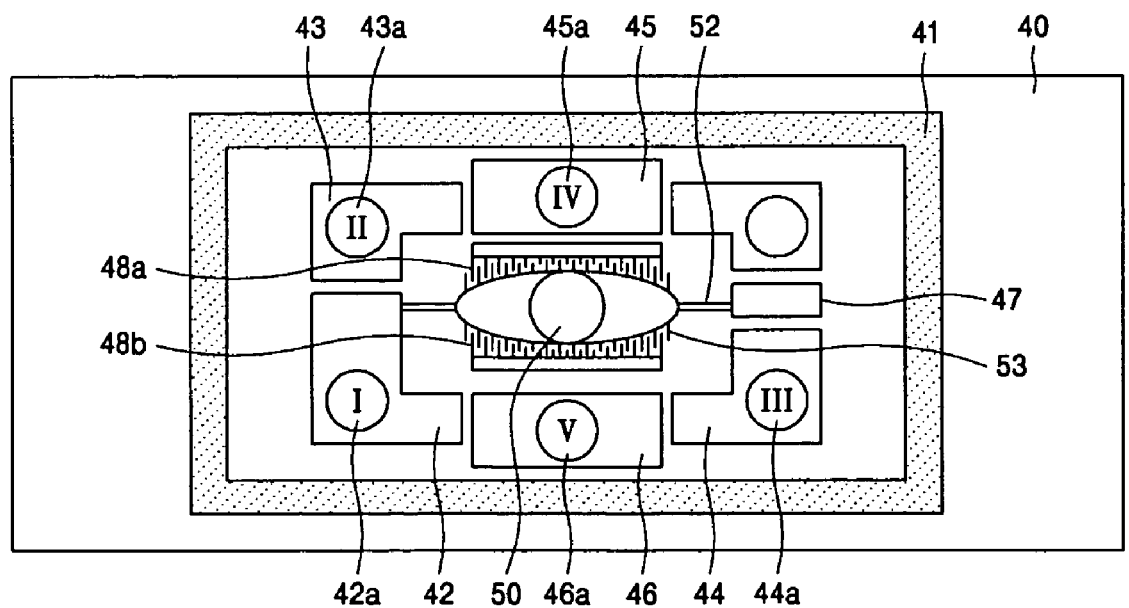
FIG. 2A is a plan view of a lower structure of an optical scanner according to an embodiment of the present invention.
Figure 2B:
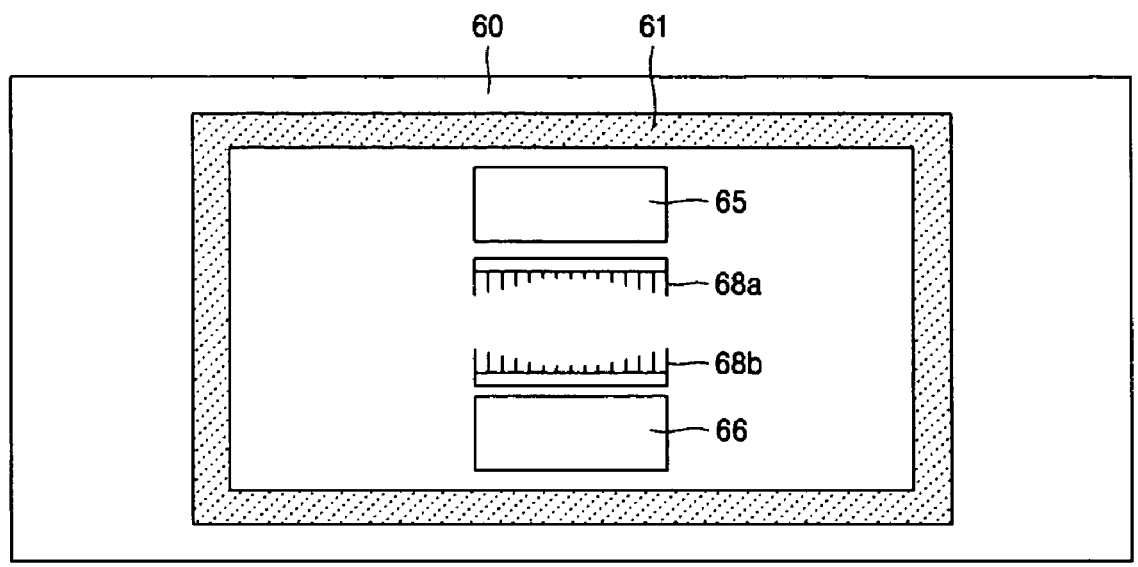
FIG. 2B is a plan view of an upper structure of the optical scanner according to an embodiment of the present invention.

FIG. 2A is a plan view of a lower structure of an optical scanner according to an embodiment of the present invention. FIG. 2B is a plan view of an upper structure of the optical scanner. As shown in FIG. 2A, a lower outer frame 41 is formed on a lower substrate 40 and vertically protrudes along an edge of the lower substrate 40. As shown in FIG. 2B, an upper outer frame 61 is formed on an upper substrate 60 and vertically protrudes along an edge of the upper substrate 60. The lower outer frame 41 and the upper outer frame 61 face each other. When an optical scanner is assembled, the lower outer frame 41 and the upper outer frame 61 are bonded to each other to seal components formed on the lower substrate 40 and the upper substrate 60 from the outside.

In the meantime, as shown in FIG. 2A, a mirror 50 and various elements for driving the mirror 50 are installed within the lower outer frame 41 and the upper outer frame 61 that are respectively formed on the lower substrate 40 and the upper substrate 60. That is, a plurality of lower static comb electrodes 48a and 48b are vertically installed on the lower substrate 40 to alternate with a plurality of movable comb electrodes 53 vertically formed at both sides of the mirror 50. A plurality of upper static comb electrodes 68a and 68b face the lower static comb electrodes 48a and 48b and are vertically installed on the upper substrate 60 to alternate with the movable comb electrodes 53.

Further, electrode structures 42 through 46 are formed on the lower substrate 40 to transfer externally applied voltage to the movable comb electrodes 53, the lower static comb electrodes 48a and 48b, and the upper static comb electrodes 68a and 68b, respectively. In FIG. 2A, a first electrode structure 42 transfers voltage to the movable comb electrodes 53. A second electrode structure 43 transfers voltage to the first lower static comb electrodes 48a. A third electrode structure 44 transfers voltage to the second lower static comb electrodes 48b. A fourth lower electrode structure 45 transfers voltage to the first upper static comb electrodes 68a. A fifth lower electrode structure 46 transfers voltage to the second upper static comb electrodes 68b. As shown in FIG. 2B, a fourth upper electrode structure 65 for transferring voltage to the first upper static comb electrodes 68a and a fifth upper electrode structure 65 for transferring voltage to the second upper static comb electrodes 68b are formed on the upper substrate 60. When the upper structure and the lower structure of the optical scanner are assembled, the fourth lower electrode structure 45 is bonded to the fourth upper electrode structure 65, and the fifth lower electrode structure 56 is bonded to the fifth upper electrode structure 66.

As shown in FIG. 2A, the first electrode structure 42 transfers voltage to the movable comb electrodes 53 at both the sides of the mirror 50 through a torsion spring 52. The torsion spring 52 suspends the mirror 50 such that the mirror 50 can seesaw. Accordingly, the first electrode structure 42 also functions as a supporter for supporting the mirror 50. A mirror supporter 47 is formed at an opposite side to the first electrode structure 42 on the basis of the mirror 50 to support the mirror 50 at the opposite side to the first electrode structure 42. Meanwhile, the second and third electrode structures 43 and 44 respectively transfer voltage to the lower static comb electrodes 48a and 48b through wires (not shown) patterned on the lower substrate 40. Further, the fourth and fifth lower electrode structures 45 and 46 transfer voltage to the upper static comb electrodes 68a and 68b formed on the upper substrate 60 through the fourth and fifth upper electrode structures 65 and 66 formed on the upper substrate 60. Wires (not shown) patterned on the upper substrate 60 electrically connect between the fourth and fifth upper electrode structures 65 and 66 and the upper static comb electrodes 68a and 68b. The electrode structures 42 through 46 on the lower substrate 40 are separated from one another and thus electrically insulated.

In the meanwhile, through-holes 42a through 46a respectively connected to the electrode structures 42 through 46 are formed under the electrode structures 42 through 46 to pass through the lower substrate 40. That is, the first through-hole 42a is formed under the first electrode structure 42, the second through-hole 43a is formed under the second electrode structure 43, the third through-hole 44a is formed under the third electrode structure 44, the fourth through-hole 45a is formed under the fourth lower electrode structure 45, and the fifth through-hole 46a is formed under the fifth lower electrode structure 46, all the through-holes passing through the lower substrate 40. The through-holes 42a through 46a are electrically connected to the electrode structures 42 through 46 and transfer voltage to the electrode structures 42 through 46. To this end, electrodes made of a conductive material, such as metal, are formed on inner surfaces of the through-holes 42a through 46a. Further, to easily mount the optical scanner on a surface of a printed circuit board (PCB), the diameters of the through-holes 42a through 46a taper away from lower sides toward upper sides contacting the electrode structures.

In a conventional optical scanner, electrode structures are not separated but are stacked. Accordingly, an insulation layer needs to be inserted between adjacent layers, resulting in a complex layer structure. The electrode structures according to the present invention, however, are separated from one another and thus insulated without specific measures, making a complex layer structure unnecessary and simplifying manufacturing processes.

Figure 3:
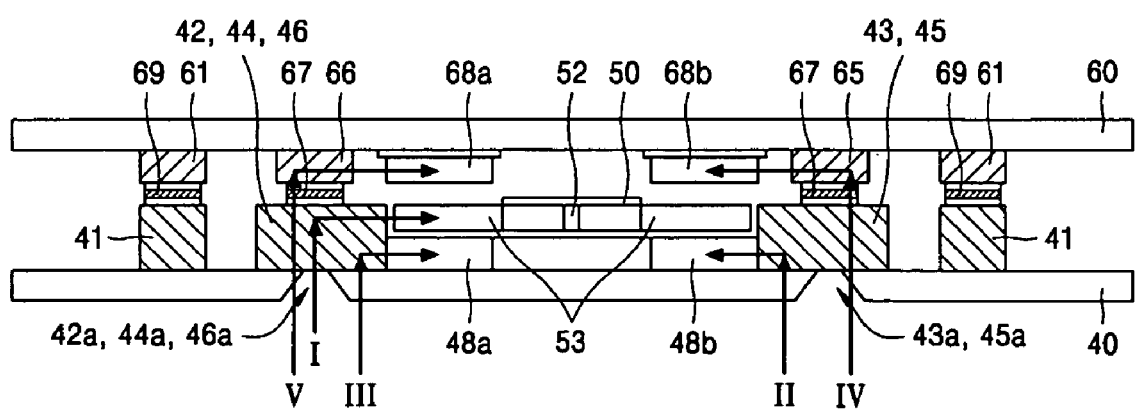
FIG. 3 is a cross-sectional view of the optical scanner in which the lower structure shown in FIG. 2A and the upper structure shown in FIG. 2B are assembled.

FIG. 3 is a cross-sectional view of the optical scanner, which is assembled. As shown in FIG. 3, the lower and upper outer frames 41 and 61 respectively formed along the edges of the lower substrate 40 and the upper substrate 60 are bonded to each other by a solder layer 69 using a flip-chip bonding method or the like. Although the outer frames 41 and 61 are shown at both sides of the lower and upper substrates 40 and 60 in FIG. 3, the lower and upper outer frames 41 and 61 are formed to surround the lower and upper substrates 40 and 60 as shown in FIGS. 2A and 2B. Accordingly, all the elements including the mirror 50 inside the optical scanner are completely sealed by the outer frames 41 and 61. After the upper and lower structures of the optical scanner are bonded to each other, the conventional art needs complex processes including a process of die-bonding the optical scanner in a silicon package to seal the optical scanner, a process of connecting wires, and a process of bonding a glass to a top surface of the silicon package. According to the present invention, however, the internal elements of the optical scanner can be completely sealed with a round of flip-chip bonding without the complex processes.

Furthermore, as shown in FIG. 3, the fourth and fifth lower electrode structures 45 and 46 formed on the lower substrate 40 are bonded to the upper electrode structures 65 and 66 formed on the upper substrate 60 by a solder layer 67. Accordingly, voltage applied to the fourth and fifth lower electrode structures 45 and 46 can be transferred to the fourth and fifth upper electrode structures 65 and 66 through the solder layer 67. Although one electrode structure is shown at one side of the mirror 50 in FIG. 3, it should be understood that the plurality of electrode structures are formed at both the sides of the mirror 50 as shown in FIGS. 2A and 2B. Also, although two through-holes formed on the lower substrate 40 are shown in FIG. 3, it should be understood that at least five through-holes 42a through 46a exist as shown in FIGS. 2A and 2B. The diameter of each of the through-holes 42a through 46a tapers away from a lower side toward an upper side as shown in FIG. 3.

On the other side, so as for a laser beam generated by an external laser source to be incident on the mirror 50 through the upper substrate 60, it is preferable that the upper substrate 60 be made of a transparent material, such as glass. At this time, to prevent the laser beam from being reflected by the upper substrate 60, it is preferable that an anti-reflection coating be applied on a surface of the upper substrate 60. The lower substrate 40 may be a silicon-on-insulator (SOI) wafer.

Figure 4:
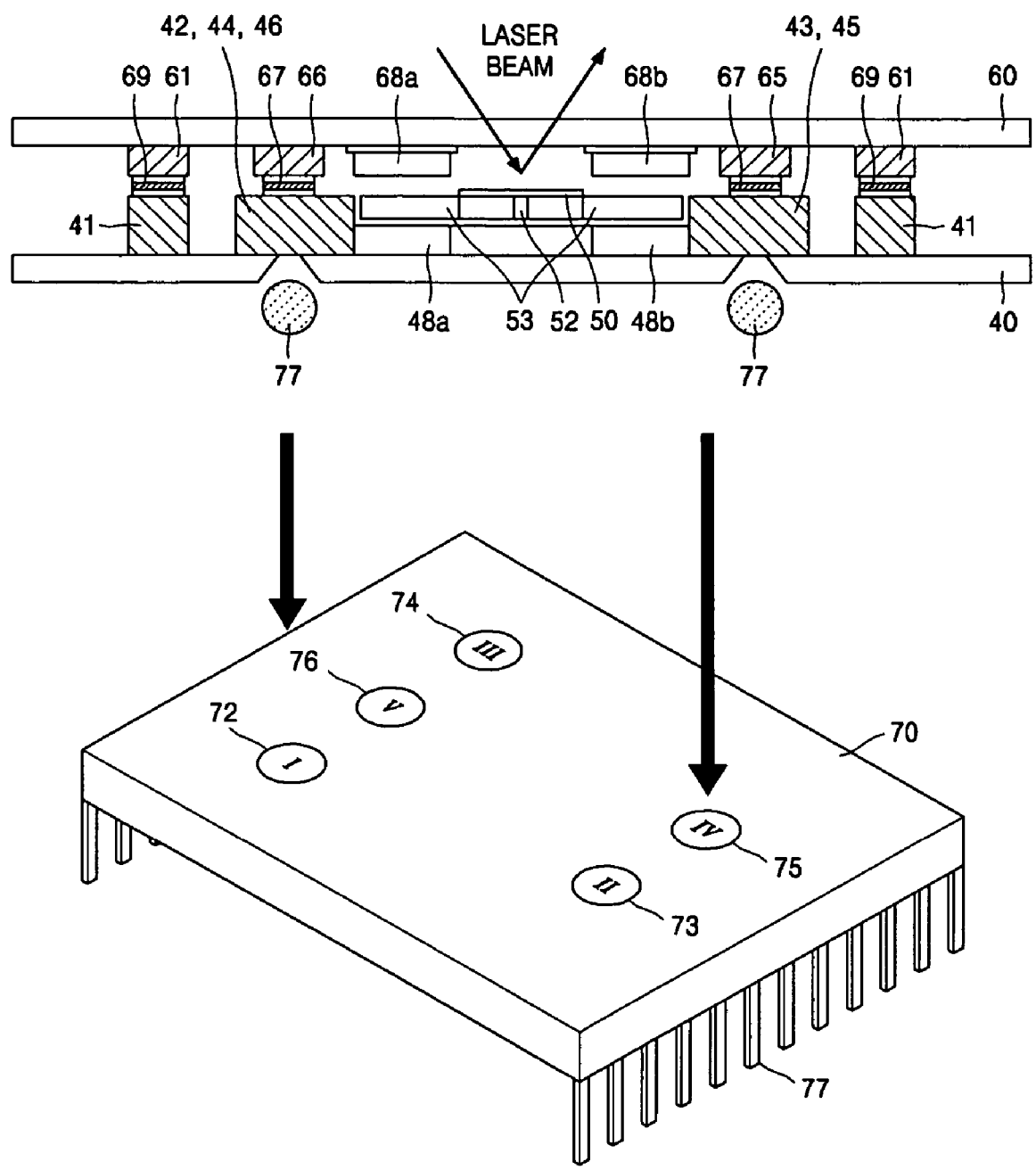
FIG. 4 is a perspective view illustrates a process of mounting the optical scanner shown in FIG. 3 on a printed circuit board (PCB).

FIG. 4 is a perspective view illustrating a process of mounting the optical scanner shown in FIG. 3 on the PCB. As shown in FIG. 4, a plurality of leads 71 for transferring signals and voltage are formed along an edge of the PCB 70. Bonding pads 72 through 76 corresponding to the through-holes 42a through 46a formed on the lower substrate 40 of the optical scanner are formed on the surface of the PCB 70. Although not shown, a plurality of wires are patterned on the PCB 70. If the electrodes (not shown) formed on the surfaces of the through-holes 42a through 46a and passing through the lower substrate 40 are bonded to the corresponding bonding pads 72 through 76 formed on the PCB 70 as shown in FIG. 4, the optical scanner can be mounted on the surface of the PCB 70. Accordingly, power and signals can be supplied to the optical scanner through the PCB 70. The optical scanner may be mounted on the surface of the PCB 70 using a solder 77 for ball grid array (BGA).

As described above, the mirror can be hermetically sealed from the outside by simply assembling the upper and lower structures of the optical scanner having the double comb electrode structure through flip-chip bonding, thereby omitting conventional processes of die-bonding the optical scanner to a silicon package, connecting wires, bonding a glass to a top surface of the silicon package, and so on. As a result, the optical scanner can be made compact, manufacturing time and costs can be reduced, and product reliability and yield can be enhanced.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An optical scanner comprising:
   an upper substrate and a lower substrate;
   a mirror suspended between the upper substrate and the lower substrate to seesaw;
   a plurality of movable comb electrodes vertically formed at predetermined intervals at both sides of the mirror;
   a plurality of upper static comb electrodes and lower static comb electrodes respectively vertically installed on the upper substrate and the lower substrate to alternate with the plurality of movable comb electrodes;
   a plurality of electrode structures respectively transmitting external voltage to the upper and lower static comb electrodes and the movable comb electrodes; and
   an upper outer frame and a lower outer frame respectively formed along edges of the upper and lower substrates and bonded to each other to seal the mirror from the outside.

2. The optical scanner of claim 1, wherein the upper substrate is made of a light-transmitting material.

3. The optical scanner of claim 2, wherein an anti-reflection coating is applied on a surface of the upper substrate.

4. The optical scanner of claim 1, wherein the electrode structures comprise:
   a first electrode structure transferring voltage to the movable comb electrodes;
   second and third electrode structures respectively transferring voltage to the lower static comb electrodes at both sides of the mirror; and
   fourth and fifth electrode structures respectively transferring voltage to the upper static comb electrodes at both the sides of the mirror.

5. The optical scanner of claim 4, wherein the first through third electrode structures are formed on the lower substrate, and the fourth and fifth electrode structures comprise fourth and fifth lower electrode structures formed on the lower substrate and fourth and fifth upper electrode structures formed on the upper substrate.

6. The optical scanner of claim 5, wherein the fourth lower electrode structure is bonded to the fourth upper electrode structure, and the fifth lower electrode structure is bonded to the fifth upper electrode structure.

7. The optical scanner of claim 6, wherein the upper static comb electrodes formed at both the sides of the mirror are electrically connected to the fourth upper electrode structure and the fifth upper electrode structure, respectively.

8. The optical scanner of claim 5, wherein the lower substrate further has first through fifth through-holes respectively connected to the first through third electrode structures and the fourth and fifth lower electrode structures to transfer voltage.

9. The optical scanner of claim 8, wherein electrodes are respectively formed on surfaces of the first through fifth through-holes.

10. The optical scanner of claim 9, wherein the optical scanner is mounted on a surface of a printed circuit board through the electrodes formed on the surfaces of the first through fifth through-holes.

11. The optical scanner of claim 10, wherein the optical scanner is mounted on the surface of the printed circuit board using a solder for ball grid array.

12. The optical scanner of claim 4, wherein the first electrode structure for transferring voltage to the movable comb electrodes also functions as a supporter for supporting the mirror to seesaw.

13. The optical scanner of claim 12, further comprising a mirror supporter disposed at an opposite side to the first electrode structure and supporting the mirror.

14. The optical scanner of claim 13, wherein the mirror is suspended by the first electrode structure and the mirror supporter through a torsion spring.

* * * * *